(12) United States Patent
Chen et al.

(10) Patent No.: US 10,956,319 B2
(45) Date of Patent: Mar. 23, 2021

(54) METHOD AND APPARATUS FOR MULTIPLE ACCESSES IN MEMORY AND STORAGE SYSTEM, WHEREIN THE MEMORY RETURN ADDRESSES OF VERTEXES THAT HAVE NOT BEEN TRAVERSED

(71) Applicant: TSINGHUA UNIVERSITY, Beijing (CN)

(72) Inventors: Wenguang Chen, Beijing (CN); Weimin Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/310,984

(22) PCT Filed: May 13, 2015

(86) PCT No.: PCT/CN2015/078863
§ 371 (c)(1),
(2) Date: Nov. 14, 2016

(87) PCT Pub. No.: WO2015/172718
PCT Pub. Date: Nov. 19, 2015

(65) Prior Publication Data
US 2017/0083236 A1    Mar. 23, 2017

(30) Foreign Application Priority Data
May 14, 2014  (CN) .......................... 201410201149.6

(51) Int. Cl.
*G06F 12/06* (2006.01)
(52) U.S. Cl.
CPC .................................. *G06F 12/06* (2013.01)

(58) Field of Classification Search
CPC ............................ G06F 12/06; G06F 9/30036
See application file for complete search history.

(56) References Cited

U.S. PATENT DOCUMENTS

| 7,401,202 | B1 * | 7/2008 | Click, Jr. | ............. | G06F 9/3001 |
| | | | | | 711/2 |
| 2007/0185849 | A1 * | 8/2007 | Vinnakota | ............. | G06F 9/3004 |

(Continued)

FOREIGN PATENT DOCUMENTS

| CN | 1929034 | 3/2007 |
| CN | 101506793 | 8/2009 |

(Continued)

OTHER PUBLICATIONS

English translation of the First Office Action issued in corresponding Chinese Application No. 201402011496 dated Apr. 28, 2016, 13 pages.

(Continued)

*Primary Examiner* — Reginald G Bragdon
*Assistant Examiner* — Chie Yew
(74) *Attorney, Agent, or Firm* — Loeb & Loeb LLP

(57) ABSTRACT

Provided are a method for multiple accesses in a memory, an apparatus supporting multiple accesses in the memory and a storage system. The method comprises: receiving a number N of addresses in the memory, wherein N is an integer larger than 1 and the number N of addresses are discontinuous; performing a preset operation according to the number N of addresses; and outputting the result of the operation. As a consequence, the performances of a computer system can be improved, and a user can input and use the desired addresses just as required by the user.

13 Claims, 4 Drawing Sheets

(56) References Cited

U.S. PATENT DOCUMENTS

| | | | | |
|---|---|---|---|---|
| 2010/0318729 | A1* | 12/2010 | Himeno | G11C 11/5628 |
| | | | | 711/103 |
| 2011/0153983 | A1* | 6/2011 | Hughes | G06F 9/30018 |
| | | | | 712/22 |
| 2012/0060015 | A1 | 3/2012 | Eichenberger et al. | |
| 2012/0079459 | A1* | 3/2012 | Bates | G06F 11/3636 |
| | | | | 717/129 |
| 2012/0151156 | A1 | 6/2012 | Citron et al. | |
| 2012/0166891 | A1* | 6/2012 | Dahlen | G06F 12/0893 |
| | | | | 714/54 |
| 2012/0324204 | A1 | 12/2012 | Inoue | |
| 2013/0318306 | A1 | 11/2013 | Gonion | |
| 2014/0040550 | A1* | 2/2014 | Nale | G06F 13/1694 |
| | | | | 711/118 |
| 2015/0012717 | A1* | 1/2015 | Murphy | G11C 7/22 |
| | | | | 711/167 |
| 2015/0304349 | A1* | 10/2015 | Bernstein | H04L 63/1425 |
| | | | | 726/22 |

FOREIGN PATENT DOCUMENTS

| | | |
|---|---|---|
| CN | 101512499 | 8/2009 |
| CN | 102171649 | 8/2011 |
| CN | 103238133 | 8/2013 |
| CN | 103942162 | 7/2014 |
| EP | 2538348 | 11/2013 |
| JP | 2000-67573 | 3/2000 |
| JP | 2007-41810 | 2/2007 |
| JP | 2012-252368 | 12/2012 |
| WO | WO 2011/102043 | 8/2011 |
| WO | WO 2011/102432 | 8/2011 |

OTHER PUBLICATIONS

English translation of the Second Office Action issued in corresponding Chinese Application No. 201402011496 dated Feb. 4, 2017, 6 pages.

English translation of the International Preliminary Report on Patentability issued in corresponding International Application No. PCT/CN2015/078863 dated Nov. 8, 2016, 8 pages.

International Search Report for International Application No. PCt/CN2015/06863 dated Aug. 4, 2015, 2 pages.

English Translation of the Notification of Reasons for Refusal issued in corresponding JP Application No. 2017-512089 dated Nov. 28, 2017, 8 pages.

English Translation of the Fourth Office Action issued in corresponding Chinese Application No. 20140201149.6 dated Jan. 22, 2018, 13 pages.

Supplementary European Search Report, issued in corresponding EP Application No. 15792922.5 dated Jun. 17, 2017, 6 pages.

English Translation of the Third Office Action issued in corresponding Chines Application No. 201402011496 dated Aug. 10, 2017, 13 pages.

European Patent Office, Communication pursuant to Article 94(3) EPC issued in corresponding Application No. 1592922.5 dated Jan. 7, 2020, 7 pages.

* cited by examiner

METHOD AND APPARATUS FOR MULTIPLE ACCESSES IN MEMORY AND STORAGE SYSTEM, WHEREIN THE MEMORY RETURN ADDRESSES OF VERTEXES THAT HAVE NOT BEEN TRAVERSED

TECHNICAL FIELD

Embodiments of the present disclosure relate to a method for multi-access in a memory, an apparatus for supporting multi-access in the memory and a memory system, and more particular to a method for multi-access in a memory, an apparatus for supporting multi-access in the memory and a memory system which can improve access performances of the memory.

BACKGROUND

Random memory access is always an important factor affecting computer performances. Generally, one access to a DRAM (Dynamic Random Access Memory) requires hundreds of clock cycles. Means such as Cache (cache memory) or prefetching are always employed by computer architectures and programming languages to reduce the random accesses to DRAM as far as possible or to reduce the influence on the performance by the random accesses.

In recent years, big data analyzing becomes an important application filed, and data structures of which a representative example is a graph are mostly used in the big data analyzing application, however, it is very difficult for methods of Cache and prefetching, etc., to perform optimization on such data structure, such that a large amount of random accesses would still occur in the structure of the processor and the memory.

Accordingly, it is desired a solution capable of improving the access performance of the computer system.

SUMMARY

Embodiments of the present disclosure provide a method for multi-access in a memory, an apparatus for supporting multi-access in the memory and a memory system, which can improve the access performance of the computer system.

According to one aspect of embodiments of the present disclosure, there is provided a method for multi-access in a memory, comprising: receiving N addresses in the memory, wherein N is an integer greater than 1 and the N addresses are non-contiguous; performing predetermined operations based on the N addresses; and outputting results of the operations.

According to another aspect of embodiments of the present disclosure, there is provided an apparatus for supporting multi-access in a memory, comprising: a receiving unit configured to receive N addresses in the memory, wherein N is an integer greater than 1 and the N addresses are non-contiguous; a processing unit configured to perform predetermined operations based on the N addresses; and an outputting unit configured to output results of the operations.

According to yet another aspect of embodiments of the present disclosure, there is provided a memory system comprising the apparatus for supporting multi-access in the memory as described above.

Accordingly, according to embodiments of the present disclosure, operations can be performed on the plurality of addresses in the memory, and these addresses may be continuous and may be non-contiguous, so that desired addresses can be input and used as a user needs. In addition, since the predetermined operations are performed based on input addresses within the memory and results of the operations are output, not only a function of the memory is extended, but also the data processing speed is improved and time is reduced.

BRIEF DESCRIPTION OF THE DRAWINGS

The present disclosure will be appreciated more easily by referring to following detailed description of the appended drawings, in which like reference numbers indicate units of same structure, and in which.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure. Any other embodiments obtained by those ordinary skilled in the art based on the embodiments of the present disclosure without inventive labors should fall into a scope sought for protection in the present disclosure.

The terminology used herein is for the purpose of describing particular embodiments only and is not intended to be limiting of the present disclosure.

As used herein, the terms "a", "one" and "the" used in the singular are intended to include plural forms as well, unless the context clearly indicates otherwise. It will be further understood that the terms "comprises" and/or "comprising of" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms used herein have the same meaning as commonly understood by one of ordinary skill in the art to which the present disclosure belongs.

It will be further understood that terms, such as those defined in commonly used dictionaries, should be interpreted as having a meaning that is consistent with their meaning in the context of the relevant art and/or the present disclosure, and should not be interpreted in an idealized or overly formal sense unless expressly so defined herein.

In the description below, illustration is made by taking the graph as an example, however, it should be understood by those skilled in the art that embodiments of the present disclosure may also be applied to other data structures such as tree, chained list, etc.

In addition, besides the DRAM, the embodiments of the present disclosure may also be applied to other storage devices and memory systems, such as a SRAM (static random access memory), a PCM (Phase Change Memory), a FRAM (ferroelectric memory) and the like.

Hereafter, embodiments of the present disclosure will be explained in details with reference to the drawings.

Figure 1:
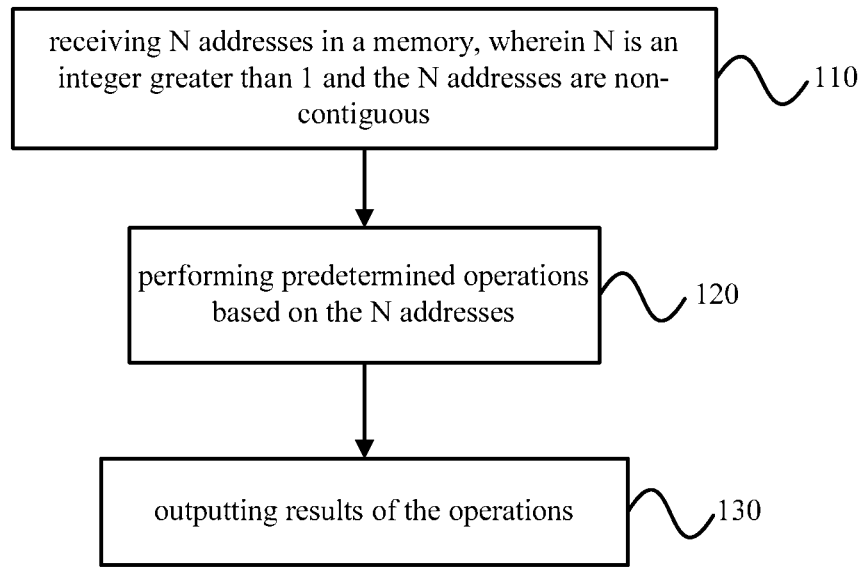
FIG. 1 is a schematic flow diagram showing a method for multi-access in a memory according to an embodiment of the present disclosure.

FIG. 1 is a schematic flow diagram showing a method 100 for multi-access in a memory according to an embodiment of the present disclosure. The method 100 may be executed in a processor.

As shown in FIG. 1, in 110 of the method 100, N addresses in the memory are received, wherein N is an integer greater than 1 and the N addresses are non-contiguous.

In 120, predetermined operations are performed based on the N addresses.

In 130, results of the operations are output.

Accordingly, according to embodiments of the present disclosure, operations can be performed on the plurality of addresses in the memory, and these addresses may be continuous and may be non-contiguous, so that desired addresses can be input and used as a user needs. In addition, since the predetermined operations are performed based on input addresses within the memory and results of the operations are output, not only a function of the memory is extended, but also the data processing speed is improved and time is reduced.

In addition, since the plurality of addresses are received one time and predetermined operations are performed, according to another embodiment of the present disclosure, intermediate results may be stored in a buffer area before the predetermined operations performed on all addresses are finished, and the addresses in the buffer area are output when the predetermined operations performed on all addresses are finished, whereby the access speed may be further increased.

Figure 2:
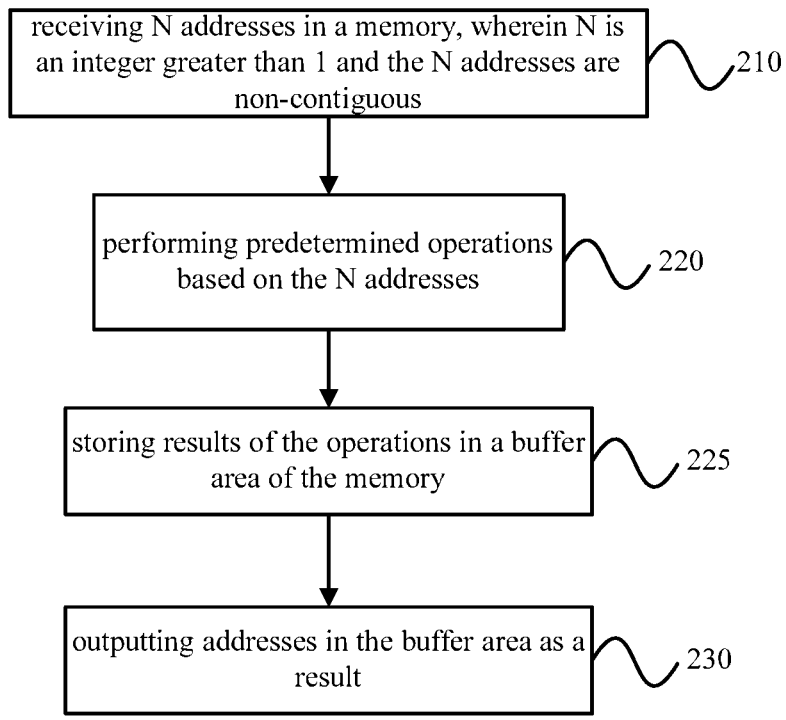
FIG. 2 is a schematic flow diagram showing a method for multi-access in a memory according to another embodiment of the present disclosure.

FIG. 2 is a schematic flow diagram showing a method 200 for multi-access in a memory according to another embodiment of the present disclosure. The method 200 may be executed in a memory.

As shown in FIG. 2, in 210 of method 200, N addresses in a memory are received, wherein N is an integer greater than 1 and the N addresses are non-contiguous.

In 220, predetermined operations are performed based on the N addresses.

In 225, results of the operations are stored in a buffer area of the memory.

In 230, outputting results of the operations in method 100 specifically includes: outputting the addresses in the buffer area as a result.

According to embodiments of the present disclosure, the intermediate results are stored temporarily in the buffer area before the operations performed on all addresses are finished, therefore the access speed can be further increased. For example, in a case that the data stored in an address is accessed, total time needed is probably hundreds of nanoseconds (for example 200 ns) as one access (input/output) is performed on the data in one address within the memory from the outside of the memory, since time overhead occupied by a handshake signal is large, about 60% of the total time; in contrast, if the buffer area is used, since the handshake signals are reduced greatly, the total time taken to perform one access on the same data within the memory may be reduced to tens of nanoseconds and even a few nanoseconds, for example, 1-2 ns. In addition, the buffer area may be configured with a structure similar to a cache (cache memory) so as to further increase the access speed. Accordingly, when the buffer area is used, the access time may be reduced.

Herein, the buffer area may be newly divided from the original buffer area within the memory, and may also be a new buffer area added to the memory. In the latter case, maybe some improvements are required on hardware of the memory. In addition, data in the buffer area may be cleared whenever the results are output.

Hereafter, the embodiments of the present disclosure will be described by taking data structure of a graph as an example, however, it should be understood by those skilled in the art that obviously the present disclosure may also be applied to other data structures besides the graph, such as the tree, chained list, etc.

Figure 3:
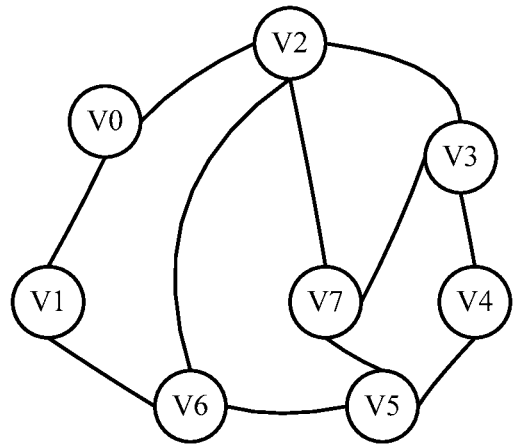
FIG. 3 is a schematic diagram showing data structure of a graph.

FIG. 3 is a schematic diagram showing data structure of a graph. While a undirected graph is shown in FIG. 3, those skilled in the art should understand that obviously it may be an oriented graph and weight information may also be included.

As shown in FIG. 3, the graph includes 8 vertexes of V0, V1, V2, V3, V4, V5, V6 and V7 and 11 edges. Generally a one-dimensional array is used to store the vertex data and a two-dimensional array is used to store the edge data. For example, one schematic vertex array V[j] ($0 \leq j \leq 7$) is shown below.

| V0 | V1 | V2 | V3 | V4 | V5 | V6 | V7 |

The vertex data may include a variety of information. In an example, when a traversal of the graph is performed, the vertex data may indicate whether the vertex has been traversed, for example, 0 indicates that the vertex has not been traversed and 1 indicates that the vertex has been traversed. In another example, in an application where a hierarchy level is specified for the vertexes, the vertex data may indicate which hierarchy level the vertex is located with respect to a center vertex specified currently. Of course, embodiments of the present disclosure are not limited thereto; those skilled in the art should understand that the vertex data may also include any other suitable information.

It can be seen from FIG. 3 that in the data structure of the graph structure, there may be correlation between any two vertexes (data elements), such that when the data in the graph is accessed with the memory, an order for accessing the vertexes cannot be determined and has a strong randomness, which is difficult to be buffered and cause a low access speed. For example, in the graph structure as shown in FIG. 3, if it is desired to access the vertex V7, in one operation, the access may be performed in an order of V2→V7, but in a next operation, the access may be performed in an order of V3→V7, and in another operation, the access may be performed in an order of V5→V7.

In one exemplary embodiment according to the present disclosure, each address may be determined based on a base address (base address) and an offset, wherein the offset indicates the distance between the address and the base address. Particularly, a plurality of offsets may be defined by form of an array, for example bias[i], herein, i is an integer, and $0 \le i \le N-1$. For example, it is assumed that the base address is the address of vertex V0 (for example 0000H) and operations are to be performed on N=4 vertexes V0, V2, V4 and V7, and it is known that the offsets of vertexes V2, V4 and V7 are 8 Bytes, 16 Bytes and 28 Bytes respectively, then N=4 offsets, i.e., bias[0]=0, bias[1]=8, bias[2]=16 and bias[3]=28 may be defined; thus receiving N addresses in a memory in 110 or 210 may further comprise: receiving the base addresses and N offsets; and determining each of the N addresses from the ith address=base address+the ith offset. Accordingly, the addresses may be derived as follows:

the address of vertex V0, i.e., the 0th address=0000H+0 Bytes;

the address of vertex V2, i.e., the 1st address=0000H+8 Bytes;

the address of vertex V4, i.e., the 2nd address=0000H+16 Bytes; and the address of vertex V7, i.e., the 3rd address=0000H+28 Bytes.

In another exemplary embodiment, besides that the offset between the address of the vertex and the base address is provided, a number of the vertex may also be used as the offset. In such a case, since an address index of the vertex generally indicates the number of the vertex, the offset may be calculated by multiplying the address index with a size of the address element, and then the address of the vertex is further determined.

Specifically, for example, it is still assumed that the base address is the address of the vertex V0 (for example 0000H) and the accesses are to be performed on N=4 vertexes V0, V2, V4 and V7, herein, 0, 2, 4 and 7 indicate the address indexes (the numbers of the vertexes), then an offset indexes array bias_index[i] ($0 \le i \le N-1$), i.e., bias_index[0]=0, bias_index[1]=2, bias_index[2]=4 and bias_index[3]=7 may be defined. In addition, it is assumed that the size of the address element for storing the address is 4 bytes (4 Bytes). Thereby, receiving N offsets may further comprise: receiving an address element size (4 Bytes) and the N address indexes, and each of the N addresses may be determined from the ith address=base address+the ith address index×address element size. Accordingly, the addresses may be derived as follows:

the address of vertex V0, i.e., the 0th address=0000H+0×4 Bytes;

the address of vertex V2, i.e., the 1st address=0000H+2×4 Bytes;

the address of vertex V4, i.e., the 2nd address=0000H+4×4 Bytes; and the address of vertex V7, i.e., the 3rd address=0000H+7×4 Bytes.

It is convenient for a user to determine the address by using the address index and the address element size, because in most cases, the user cannot know the exact address of the vertex, but may know the number of each vertex. Accordingly, by using the correspondence between the number of the vertex and its address index, it is possible to determine an actual address fast and conveniently. As compared with a scenario in which the actual address is needed to be input, time taken for inputting the data are greatly reduced, and in this way, it is convenient for the user to check whether the vertex being input is correct, and for user's operations, it is friendly.

In addition, it can be seen that according to embodiments of the present disclosure, there is no requirements on whether the vertexes to be operated are continuous or not; accordingly, the accesses may be performed on any continuous or non-contiguous vertexes, thus the accesses are more target-oriented.

In addition, as those skilled in the art should understand that the meaning of the terminology "non-contiguous" is generic, not only including vertexes or addresses which are discrete absolutely, for example, the above 4 vertexes V0, V2, V4 and V7, but also including vertexes or addresses which are continuous partly, for example, vertexes V0 to V4 and vertex V7, 5 vertexes in total.

It should be noted that while the N addresses are input in an ascending order in the example above, the plurality of addresses may be input in any suitable order without following an ascending order or a decreasing order because the plurality of addresses being input may be non-contiguous.

According to an exemplary embodiment of the present disclosure, performing predetermined operations based on the N addresses in 120 or 220 may comprise: performing predetermined operations on data stored at the N addresses.

Figure 4:
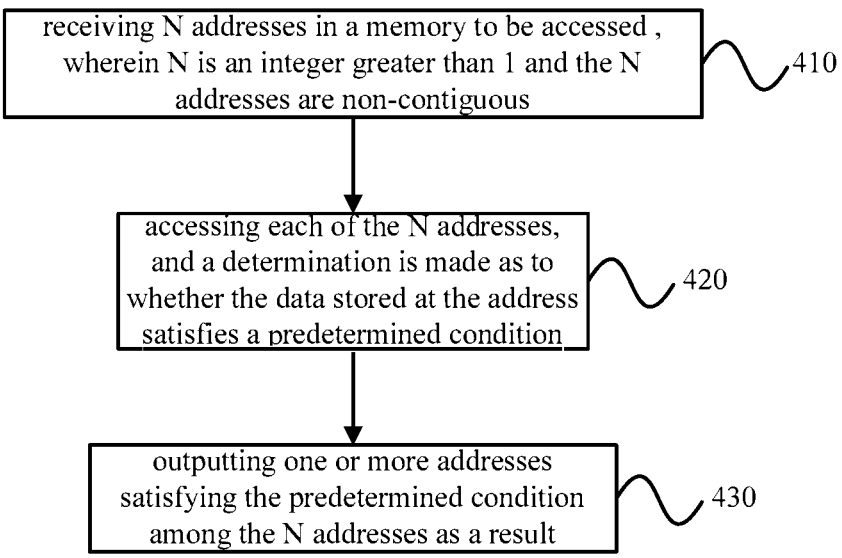
FIG. 4 is a schematic flow diagram showing a method for multi-access in a memory when predetermined operations are performed on data stored at N addresses according to a specific implementation of the present disclosure.

FIG. 4 is a schematic flow diagram showing a method 400 for multi-access in a memory when predetermined operations are performed on data stored at the N addresses according to a specific implementation of the present disclosure. The method 400 may be executed in a memory.

As shown in FIG. 4, in 410 of method 400, N addresses in a memory to be accessed are received, wherein N is an integer greater than 1 and the N addresses are non-contiguous.

In 420, each of the N addresses is accessed, and a determination is made as to whether the data stored at the address satisfies a predetermined condition.

In 430, one or more addresses satisfying the predetermined condition among the N addresses are output as a result.

In the method 400, the N addresses may be non-contiguous. Of course, those skilled in the art should understand that the N addresses may also be continuous.

Therefore, according to the specific implementation of the present disclosure, the plurality of addresses in the memory may be accessed, and the returned result includes one or more addresses in compliant with the condition; accordingly as compared with a conventional operation in which only one address can be accessed at one time, the access speed is improved greatly, and thus the access performance of the computer system can be improved. Moreover, these addresses to be accessed may be continuous, and may also be non-contiguous, so that desired addresses may be accessed as a user needs.

In addition, since a decision as to whether the data at the respective addresses satisfies a condition may be made within the memory, time taken for inputting/outputting is saved and the processing speed is improved.

In addition, since the plurality of addresses are accessed at one time, as stated above, according another specific implementation of the present disclosure, the intermediate results may be stored in a buffer area before the accesses performed on all addresses are finished, and the addresses in the buffer area are output as a result when the accesses performed on all addresses are finished, whereby the access speed may be further increased.

Figure 5:
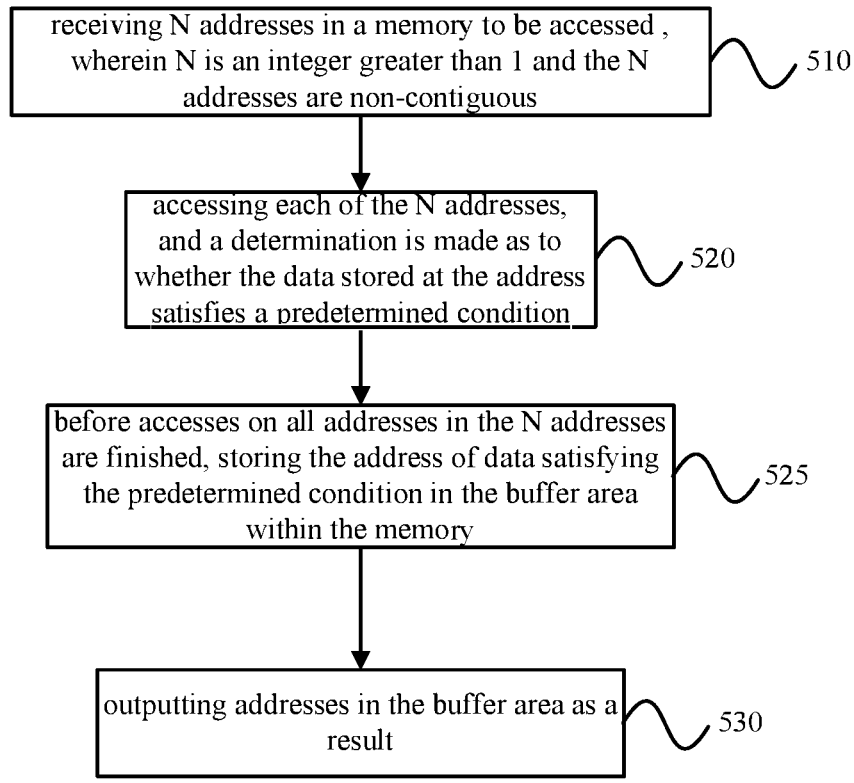
FIG. 5 is a schematic flow diagram showing a method for multi-access in a memory when predetermined operations are performed on data stored at N addresses according to another specific implementation of the present disclosure.

FIG. 5 is a schematic flow diagram showing a method 500 for multi-access in a memory when predetermined operations are performed on data stored at N addresses according to another specific implementation of the present disclosure. The method 500 may be executed in a memory.

As shown in FIG. 5, in 510 of method 500, N addresses in a memory to be accessed are received, wherein N is an integer greater than 1.

In 520, each of the N addresses is accessed, and a determination is made as to whether the data stored at the address satisfies a predetermined condition.

In 525, before accesses on all addresses among the N addresses are finished, the address of data satisfying the predetermined condition is stored in the buffer area within the memory.

In 530, outputting one or more addresses satisfying the predetermined condition among the N addresses as a result in step 530 specifically includes: outputting the addresses in the buffer area as a result.

Thus, according to the specific implementation of the present disclosure, the access speed is improved greatly by disposing the buffer area. Accordingly, when the plurality of addresses in the memory are accessed by using the buffer area, the access time may be reduced.

After receiving the N addresses to be accessed, according to a specific implementation of the present disclosure, when predetermined operations are performed on the data stored at the N addresses, the method (method 400 or method 500) for accessing in the memory may access the data in these addresses to determine whether the data stored at the address satisfies the predetermined condition.

In an example, the predetermined condition herein may be arbitrarily specified by the user based on actual requirements. In an example, in case of the traversal of the graph, the predetermined condition may indicate whether the vertex has been traversed, and the addresses of the vertexes (the numbers of the vertexes) which have not been traversed may be returned as a result. In another example, in case that the hierarchy level is specified for the vertexes with respect to a certain predetermined vertex, the predetermined condition may indicate whether the vertex has been specified the hierarchy level or to which level the vertex belongs with respect to the predetermined vertex, and addresses of the vertexes which have not been specified hierarchy levels or the vertexes having a specified hierarchy level and even the respective vertexes having the several specified hierarchy levels may be returned as the result.

Accordingly, in a specific implementation of the present disclosure, when a determination is made as to whether the data stored at the address satisfies a predetermined condition, operations including relational operations and/or logical operations may be performed on data with a predetermined condition value, and it may determine that the predetermined condition is satisfied when the result of the operations indicates true. Here, the relational operations may include, but are not limited to, equal to, greater than, greater than or equal to, less than, less than or equal to and, not equal to, and the logical operations may include, but are not limited to, AND, OR and exclusive-NOR. Of course, embodiments of the present disclosure are not limited thereto; those skilled in the art should understand that the operations here may also comprise existing operations and any suitable operations to be developed in the future.

In addition, when it is determined that the predetermined condition is satisfied, the original value of the data may further be replaced with a new value, and the new value may be a constant value for the N addresses or a function of the original value of the data at each address.

Alternatively, the new value may also be a set of values corresponding to one or more of the N addresses, and such the set of values may be set by the user, or specified or retrieved internally by a system depending on conditions, so that different values may be written at each address or several addresses which are in compliant with the predetermined condition.

For example, for each address to be accessed, the operations expressed by the following pseudo addresses may be performed:

```
if (*(base_address + bias_index[i]*element_size) op condition_value ==
true)
{
    *(base_address + bias_index[i]*element_size) = new_value;
    push bias_index[i]
}.
```

Here, base_address indicates the base address, bias_index[i] indicates a group of the address indexes, element_size indicates the address element size, op indicates the operations being performed, condition_value indicates the predetermined condition value, and new_value indicates the new value.

Herein, when condition_value indicates the original value of the data at the address and op is "==" (equal to), the operation is similar to a conventional comparison and update (Compare And Swap, CAS) operation. However, unlike the conventional CAS operation, such operation in the embodiment of the present disclosure may be performed on a plurality of addresses, and these addresses may be non-contiguous. In addition, in an embodiment of the present disclosure, before accesses performed on a plurality of addresses are finished, each bias_index[i] in compliant with the condition may be stored temporarily in a buffer area, and the addresses in the buffer area are outputted as a result until the accesses performed on all addresses are finished.

It is understood that, in another embodiment, no operations may be performed on the addresses satisfying the condition, and only its address needs to be returned, for example:

```
if (*(base_address + bias_index[i]*element_size) op condition_value ==
true)
{
    push bias_index[i]
}.
```

In addition to the relational operations indicating equal to, "op" in the above-mentioned pseudo codes may also be other relational operations such as greater than ">", greater than or equal to ">=", less than "<", less than or equal to "<=" and not equal to "!=", and "op" may also be logical operations comprising "AND", "OR" and exclusive-NOR "NOR" etc. However, it should be understood by those skilled in the art that the above-mentioned relational operations and logical operations are only for schematic illustration, and embodiments of the present disclosure are not limited thereto, and may also comprise any combinations of suitable operations as well as operations to be developed in the future.

In one further embodiment, the predetermined condition may be not only a constant predetermined condition value "condition_value", but also a relational expression, for example may be a expression for the predetermined condition value and the original value of the address etc.

Accordingly, according to embodiments of the present disclosure, when the determination is made as to whether the data stored at the address satisfies a predetermined condition, the decision on the predetermined condition is very flexible, including a plurality of operations, thus a variety of requirements may be satisfied.

In addition, while the predetermined conditions for the N addresses are the same in the above description, embodiments of the present disclosure are not limited thereto, and in some embodiments, the predetermined conditions for the N addresses may be different. In other words, "op" and "condition_value" as described above may comprise elements corresponding to the respective N addresses, for example, may be provided in a form of arrays of op[i] and condition_value[i], wherein $0 \leq i \leq N-1$.

Figure 6:
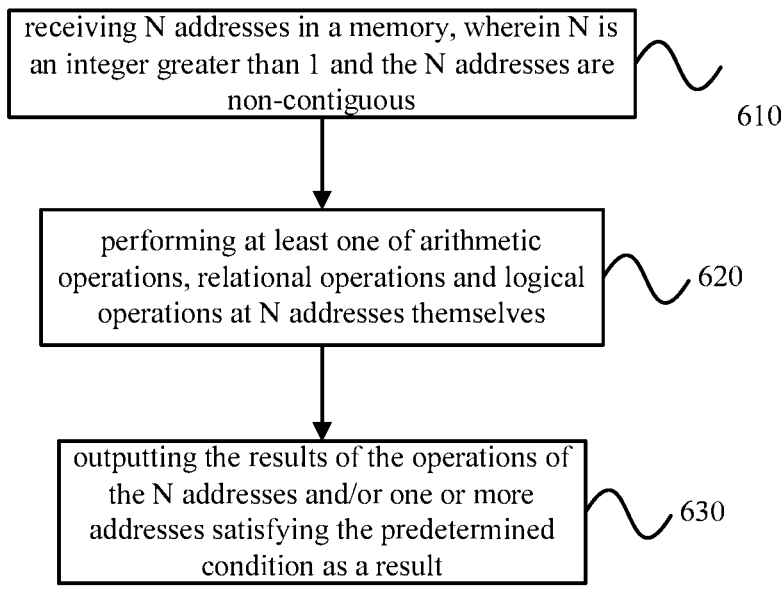
FIG. 6 is a schematic flow diagram showing a method for multi-access in a memory when predetermined operations are performed on N addresses according to another specific implementation of the present disclosure.

FIG. 6 is a schematic flow diagram showing a method 600 for multi-access in a memory when the predetermined operations are performed on the data stored at the N addresses according to yet another specific implementation of the present disclosure. The method 600 may be executed in a memory.

As shown in FIG. 6, in 610 of method 600, N addresses in a memory are received, wherein N is an integer greater than 1 and the N addresses are non-contiguous.

In 620, at least one of arithmetic operations, relational operations and logical operations are performed on the data stored at the N addresses.

In 630, results of the operations are output as a result.

In an example, the arithmetic operations, such as one or more of addition, subtraction, and division, may be performed on the data stored at the N addresses, and results including a sum, a difference and a product after the operations are output, for example, the following pseudo codes show a case of summing:

```
{ sum = 0;
for ( i=0; i<N; i++)
    sum = sum +*(base_address + bias_index[i]*element_size);
output sum
}.
```

In addition, the relational operations may also be performed on the data stored at the N addresses to derive a maximum value, a minimum value, and a intermediate value among these data, etc.

Of course, the above-mentioned pseudo codes only shows that one of the arithmetic operations, relational operations and logical operations are performed on the data stored at the N addresses, but those skilled in the art should understand that at least one of the arithmetic operations, relational operations and logical operations may be performed on the data stored at the N addresses.

In addition, when the above operations are performed on the data stored at the N addresses, the buffer area may also be used to increase speed, that is, the intermediate results are stored temporarily in the buffer area before the operations on the all N addresses are finished, and then the results in the buffer area are output as the result of the operations until the operations on the N addresses are ended. This is similar to some of the implementations described previously, therefore the detailed description thereof will not be repeated for brevity.

Figure 7:
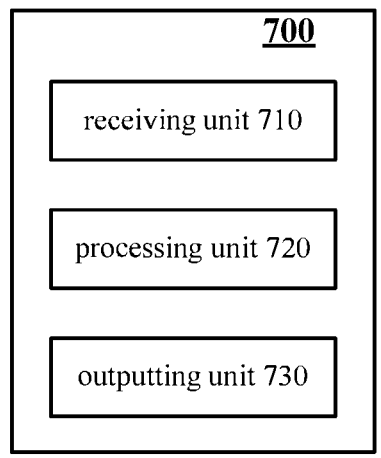
FIG. 7 is a schematic block diagram showing an apparatus for supporting multi-access in the memory according to an embodiment of the present disclosure.

FIG. 7 is a schematic block diagram showing an apparatus 700 for supporting multi-access in the memory according to an embodiment of the present disclosure. The apparatus 700 may also be called as a Multi-Random Access Memory with Processing Function (MRAMPF).

As shown in FIG. 7, the apparatus 700 for supporting multi-access in the memory may comprise: a receiving unit 710, a processing unit 720 and an outputting unit 730.

The receiving unit 710 is configured to receive N addresses in the memory, wherein N is an integer greater than 1 and the N addresses are non-contiguous.

The processing unit 720 is configured to perform predetermined operations based on the N addresses.

The outputting unit 730 is configured to output results of the operations.

Accordingly, according to embodiments of the present disclosure, operations can be performed on the plurality of addresses in the memory, and these addresses may be continuous and may be non-contiguous, so that desired addresses can be input and used as a user needs. In addition, since the predetermined operations are performed based on input addresses within the memory and results of the operations are output, not only a function of the memory is extended, but also the data processing speed is improved and time is reduced.

In addition, since the plurality of addresses are received one time and predetermined operations are performed, according to another embodiment of the present disclosure, intermediate results may be stored in a buffer area before the predetermined operations performed on all addresses are finished, and the addresses in the buffer area are output when the predetermined operations performed on all addresses are finished, whereby the access speed may be further increased.

Figure 8:
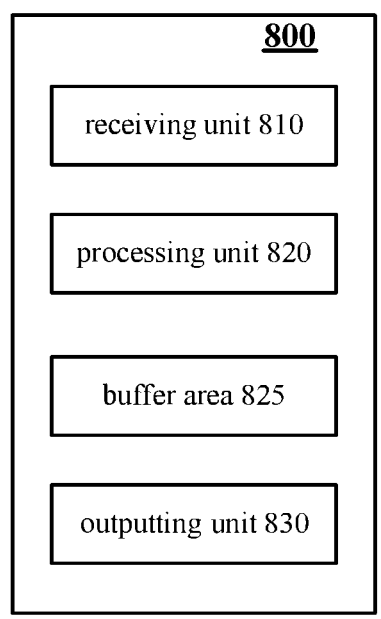
FIG. 8 is a schematic block diagram showing an apparatus for supporting multi-access in the memory according to another embodiment of the present disclosure.

FIG. 8 is a schematic block diagram showing an apparatus 800 for supporting multi-access in the memory according to another embodiment of the present disclosure. The apparatus 800 differs from the apparatus 700 shown in FIG. 7 in that a buffer area 825 is further included to store intermediate results before operations on all addresses among the N addresses are finished by a processing unit 820. A receiving unit 810, a processing unit 820 and an outputting unit 830 included in the apparatus 800 shown in FIG. 8 correspond to the receiving unit 710, the processing unit 720 and the outputting unit 730 shown in FIG. 7, they have analogous structures and perform analogous functions respectively, the details thereof will not be repeated herein.

Accordingly, in an example, the outputting unit 830 output the results of the operations stored within the buffer area 825. Accordingly, according to the embodiments of the present disclosure, since the intermediate results are stored temporarily in the buffer area before the operations performed on all addresses are finished, the access speed may be further increased.

As mentioned above, the buffer area 825 herein may be newly divided from the original buffer area within the memory, and may also be a new buffer area added to the memory. In the latter case, there is needed an improvement on hardware of the memory. In addition, the data in the buffer area may be cleared whenever the data in the buffer area is output.

In an example, the each address is determined by the processing units 720 or 820 based on the base address and the offset, wherein the offset indicates the distance between the address and the base address. In such a case, the receiving units 710 or 810 may receive the base address and N offsets as the N addresses in the memory, and the processing unit 720 or 820 determines each of the N addresses from the ith address=base address+the ith offset, $0 \leq i \leq N-1$.

For example, as described above, a plurality of offsets may be defined in a form of array, for example bias[i], herein, i is an integer, and $0 \leq i \leq N-1$.

In addition, the N offsets received by the receiving units 710 or 810 may also include the address element size and the N address indexes, and the processing units 720 or 820 may determine each of the N addresses from the ith address=base address+the ith address index×the address element size.

For example, when the vertexes to be accessed are V0, V2, V4 and V7, and 0, 2, 4 and 7 indicate the address indexes (the number of the vertex), an array of offset indexes bias_index[i](0≤i≤N−1) is defined, i.e., bias_index[0]=0, bias_index[1]=2, bias_index[2]=4 and bias_index[3]=7. Meanwhile, with an assumption that an address element size for storing addresses is 4 bytes (4 Bytes), receiving N offsets may further comprise: receiving the address element size (4 Bytes) and the N address indexes.

Of course, besides that the N addresses to be accessed are determined by the processing units 720 or 820, the determination may also be made by the receiving units 710 or 810, and then the determined N addresses are transmitted to the processing units 720 or 820.

In an example, all of the N addresses are transmitted to the processing units 720 or 820 after the receiving units 710 or 810 receive and determine all of the N addresses. Alternatively, each time one address is determined by the receiving units 710 or 810, it may be transmitted to the processing units 720 or 820.

As can be seen from the above description, performing predetermined operations based on the N addresses by the processing units 720 or 820 may comprise: performing predetermined operations on the data stored at the N addresses.

When the predetermined operations are performed on the data stored at the N addresses, the processing units 720 or 820 may access each of the N addresses, and determine whether the data stored at the address satisfies a predetermined condition, and the outputting units 730 or 830 may output one or more addresses satisfying the predetermined condition among the N addresses as the result.

In an example, before the accesses on the all addresses among the N addresses are finished, the addresses of data satisfying the predetermined condition are stored in the buffer area within the memory. After the accesses on the all addresses among the N addresses are finished, the outputting units 730 or 830 may output the addresses in the buffer area as the result.

In an example, determining, by the processing units 720 or 820, whether the data stored at the address satisfies the predetermined condition may comprise: performing operations including relational operations and/or logical operations on the data with a value of the predetermined condition, and determining the predetermined condition is satisfied when the result of the operations indicates true. Herein, the relational operations may include, but are not limited to, equal to, greater than, greater than or equal to, less than, less than or equal to, and not equal to, and the logical operations may include, but are not limited to, AND, OR and exclusive-NOR.

In addition, in an example, when it is determined that the predetermined condition is satisfied, the processing units 720 or 820 may replace the original value of the data with a new value, wherein, the new value may be a constant value or a function of the original value.

Obviously, in the apparatus 700 or 800 according to embodiments of the present disclosure, the predetermined conditions for N addresses may be the same or different.

It should be noted that a selection for the number of the plurality of addresses i.e, N, may depend on actual situations, such as user requirements, hardware design, computing power etc., for example, N may be 32, 64 etc. N may be appropriately selected so that the processing performance of the memory will not be affected.

In addition, when the predetermined operations are performed on the N addresses, the processing units 720 or 820 may perform at least one of arithmetic operations, relational operations and logical operations on the data stored at the N addresses, and the outputting units 730 or 830 may output the result of the operations as the result. The particular details of these operations have been described previously, so the details will not be repeated here.

In the following pseudo codes, an exemplary implementation for performing multi-access in a memory according to an embodiment of the present disclosure is shown.

```
CALL_MRAMPF(
base_address,
bias_index[i], // the numbers of a plurality of vertexes to be operated
(address indexes)
element_size,
Function(parameter)
output
).
```

Herein, base_address indicates the base address, bias_index[i] indicates a group of address indexes which may be continuous or non-contiguous, element_size indicates the address element size (for example 4 Bytes), Function( ) indicates the predetermined operations to be performed, and parameter indicates the parameter needed for the predetermined operations and may be one or more, and output indicates the address to which result will be outputted. In such a case, N addresses to be actually operated may be determined based on the following equations:

$$base\_address + bias\_index[0] * element\_size$$
$$base\_address + bias\_index[1] * element\_size$$
$$\ldots$$
$$base\_address + bias\_index[N-1] * element\_size.$$

Of course, those skilled in the art should understand that bias_index[i]*element_size may be replaced with bias[i], and each of op, condition_value and new_value may be a group of element, and even is an expression.

For example, when the predetermined operation to be performed on the data stored at the N addresses is to determine whether the data stored at the addresses satisfies a predetermined condition, Function(parameter) may be, for example, Function(op, condition_value, new_value), here op indicates the operation to be performed, condition_value indicates a predetermined condition value, new value indicates a new value.

For example, when the predetermined operation to be performed on the data stored at N addresses is at least one of the arithmetic operation, the relational operation and the logical operation, Function(parameter) may be, for example, Function(op), and even may be a Function(op1, op2, op3, . . . ), or a Function(op1[i], op2[i], op3[i], . . . ).

Accordingly, those skilled in the art should understand that the function of Function(parameter) may be arbitrarily set based on design requirements, but not limited to embodiments as described above.

In addition, embodiments of the present disclosure also include a memory system including the apparatus 700 or 800 for supporting multi-access in a memory as described above in connection with FIG. 7 or FIG. 8.

While the above illustration is made by referring to the data structure of the graph, embodiments of the present disclosure are not limited thereto, and those skilled in the art should understand that embodiments of the present disclosure may also be applied to other data structures, so that effect of improving the performance of random access is achieved.

It is to be noted that, only the parts pertaining to the embodiments of the present disclosure are shown in FIG. 7 and FIG. 8 for clarity and concise, however, it should be understood by those skilled in the art that the devices or apparatuses shown in FIG. 7 and FIG. 8 may comprise other necessary units.

For the purpose of convenience and simplicity of the description, it is clear that those skilled in the art can easily understand the particular processes of the systems, apparatus and units therein as described above with reference to the corresponding processes in the embodiments of the method described hereinbefore, and the detailed thereof is omitted.

It should be understood from the embodiments provided in the present disclosure that the disclosed systems, apparatus and method can be implemented in other ways. For example, the above-described device embodiments are merely illustrative in nature, such as the division of the units, just is a logic function division, and another division manner may be adopted in an actual implementation, for example a plurality of units or components may be combined or can be integrated into another system, or some of the features can be ignored or not performed. In addition, mutual coupling or direct coupling or communication connection shown and discussed above may be an indirectly coupling or a communication connection via a number of interfaces, devices or units, an may be electrical, mechanical, or other form.

The units described as separate members may be or may not be physically separated, and components shown as a cell may be or may not be physical units, either can be located in a place, or can be distributed to a plurality of network units. According to the actual requirements, part or all of the units can be selected to achieve the purpose of the technical solution of the present disclosure.

Furthermore, the individual functional units in various embodiments of the present disclosure may be integrated into one processing unit, or each unit may be a separate physical presence, or two or more units may be integrated into a single unit. The integrated units can be implemented both in the form of hardware and in the form of software function units.

It is also worth noting that in the apparatus and the method according to the present disclosure, obviously, various components or various steps may be decomposed and/or recombined. These decompositions and/or recombinations should be construed as equivalents of the present disclosure. And, a list of processing steps may be performed in chronological order as illustrated, but do not necessarily refer to the chronological order.

Some of the steps may be performed concurrently or independently of each other.

The above descriptions only illustrate the specific embodiments of the present disclosure, and the protection scope of the present disclosure is not limited to this. Any ordinary person skilled in the art may easily make various modifications and alterations, and it is intended that all these modifications and alterations should be encompassed within the scope of the present disclosure. Therefore, the scope of the present disclosure should be defined by the appended claims.

This application claims priority to China Patent Application No. 201410201149.6, filed on May 14, 2014, and the content of which in its entirety is herein incorporated by reference as part of the present application.

What is claimed is:

1. A method for multi-access in a memory, comprising:
   receiving, at a memory, N addresses in the memory, wherein N is an integer greater than 1 and the N addresses are non-contiguous;
   performing, at the memory, predetermined operations based on the N addresses, the predetermined operations comprising:
      accessing each of the received N addresses, and determining that data stored at each of the received N addresses satisfies a predetermined condition;
      replacing an original value of the data with a new value when the predetermined condition is satisfied, wherein, the new value may be one of: a constant value, a function of the original value, or a set of values corresponding to one or more of the N addresses;
      and storing first addresses of the received N addresses of the data satisfying the predetermined condition in a buffer area within the memory, before the accesses on all addresses among the N addresses are finished;
   and outputting results of the multi-access, comprising:
      outputting the first addresses of the received N addresses stored in the buffer area as the results of the multi-access,
      wherein the multi-access is traversal of a graph including a plurality of vertexes, the predetermined condition indicates whether a vertex of the plurality of vertexes has been traversed, and addresses of the vertexes which have not been traversed are the results of the multi-access.

2. The method as claimed in claim 1, wherein:
   outputting the first addresses of the received N addresses stored within the buffer area after the predetermined operations performed on the N addresses are completed.

3. The method as claimed in claim 1, wherein each address in the N addresses is determined based on a base address and an offset, wherein the offset indicates a distance between each address in the N addresses and the base address,
   wherein receiving the N addresses in the memory further comprises:
   receiving the base address and N offsets; and
   determining each of the N addresses from an ith address=the base address+an ith offset, $0 < i \leq N-1$,
   wherein receiving the N offsets further comprises receiving an address element size and N address indexes, and
   wherein the ith offset is determined as the ith offset=an ith address index×the address element size.

4. The method as claimed in claim 3, wherein determining that the data stored at each of the received N addresses satisfies the predetermined condition comprises:
   performing at least one of arithmetic operations, relational operations and logical operations on the data stored at the N addresses.

5. The method as claimed in claim 1, wherein determining that the data stored at each of the received N addresses satisfies the predetermined condition comprises:
performing a first operation including at least one of relational operations and logical operations on the data and a predetermined condition value; and
determining that the predetermined condition is satisfied when result of the first operation indicates true,
wherein the relational operations comprise equal to, greater than, greater than or equal to, less than, less than or equal to and not equal to, and the logical operations include AND, OR and exclusive-NOR.

6. The method as claimed in claim 1, wherein the predetermined condition is same or different for the N addresses.

7. An apparatus for supporting multi-access in a memory, comprising:
a receiver, executed by a processor, for receiving, at the memory, N addresses in the memory, wherein N is an integer greater than 1 and the N addresses are non-contiguous;
wherein the processor configured to perform, at the memory, predetermined operations based on the N addresses, the predetermined operations comprising:
accessing each of the received N addresses, and determining that data stored at each of the received N addresses satisfies a predetermined condition;
when the predetermined condition is satisfied, replacing an original value of the data with a new value when the predetermined condition is satisfied, wherein the new value may be one of: a constant value, a function of the original value, or a set of values corresponding to one or more of the N addresses;
and storing first addresses of the received N addresses of the data satisfying the predetermined condition in a buffer area within the memory, before the accesses on all addresses among the N addresses are finished;
and an outputter, executed by the processor, for outputting results of the multi-access, the outputting comprising:
outputting the first addresses of the received N addresses stored in the buffer area as the results of the multi-access,
wherein the multi-access is traversal of a graph including a plurality of vertexes, the predetermined condition indicates whether a vertex of the plurality of vertexes has been traversed, and addresses of the vertexes which have not been traversed are the results of the multi-access.

8. The apparatus as claimed in claim 7,
wherein the outputter outputs the first addresses of the received N addresses stored within the buffer area after the predetermined operations performed on the N addresses are completed.

9. The apparatus as claimed in claim 7, wherein each address in the N addresses is determined based on a base address and an offset, wherein the offset indicates a distance between each address in the N addresses and the base address,
wherein the receiver receives the base address and N offsets, and
determines each of the N addresses from an ith address=the base address+an ith offset, $0 < i \leq N-1$,
wherein receiving the N offsets further comprises receiving an address element size and N address indexes, and wherein the ith offset is determined as the ith offset=ith address index×the address element size.

10. The apparatus as claimed in claim 7, wherein determining, by the processor, that data stored at each of the first addresses of the received N addresses satisfies the predetermined condition comprises:
performing a first operation including at least one of relational operations and logical operations on the data and a predetermined condition value; and
determining that the predetermined condition is satisfied when result of the first operation indicates true,
wherein the relational operations comprise equal to, greater than, greater than or equal to, less than, less than or equal to and not equal to, and the logical operations include AND, OR and exclusive-NOR.

11. The apparatus as claimed in claim 7, wherein the predetermined condition is same or different for the N addresses.

12. The apparatus as claimed in claim 7, wherein determining that the data stored at each of the received N addresses satisfies the predetermined condition comprises:
the processor performs at least one of arithmetic operations, relational operations and logical operations on the data stored at the N addresses.

13. A memory system including an apparatus for supporting multi-access in a memory, the apparatus comprising:
a receiver, executed by a processor, for receiving, at the memory, N addresses in the memory, wherein N is an integer greater than 1 and the N addresses are non-contiguous;
wherein the processor configured to perform, at the memory, predetermined operations based on the N addresses, the predetermined operations comprising:
accessing each of the received N addresses, and determining that data stored at each of the received N addresses satisfies a predetermined condition;
replacing an original value of the data with a new value when the predetermined condition is satisfied, wherein, the new value may be one of: a constant value, a function of the original value, or a set of values corresponding to one or more of the N addresses;
and storing first addresses of the received N addresses of the data satisfying the predetermined condition in a buffer area within the memory, before the accesses on all addresses among the N addresses are finished;
and an outputter, executed by the processor, for outputting results of the multi-access, the outputting comprising:
outputting the first addresses of the received N addresses stored in the buffer area as the results of the multi-access,
wherein the multi-access is traversal of a graph including a plurality of vertexes, the predetermined condition indicates whether a vertex of the plurality of vertexes has been traversed, and addresses of the vertexes which have not been traversed are the results of the multi-access.

* * * * *